United States Patent
Lindner et al.

(10) Patent No.: US 12,110,571 B2
(45) Date of Patent: Oct. 8, 2024

(54) METHOD FOR PARTIAL COLD DEFORMATION OF STEEL WITH HOMOGENEOUS THICKNESS

(71) Applicant: Outokumpu Oyj, Helsinki (FI)

(72) Inventors: Stefan Lindner, Willich (DE); Claire Heidecker, Duesseldorf (DE)

(73) Assignee: Outokumpu Oyj, Helsinki (FI)

( * ) Notice: Subject to any disclaimer, the term of this patent is extended or adjusted under 35 U.S.C. 154(b) by 638 days.

(21) Appl. No.: 16/755,313

(22) PCT Filed: Oct. 10, 2018

(86) PCT No.: PCT/EP2018/077648
§ 371 (c)(1),
(2) Date: Apr. 10, 2020

(87) PCT Pub. No.: WO2019/072937
PCT Pub. Date: Apr. 18, 2019

(65) Prior Publication Data
US 2021/0189518 A1    Jun. 24, 2021

(30) Foreign Application Priority Data
Oct. 10, 2017    (EP) .................................... 17195782

(51) Int. Cl.
*C21D 9/48*    (2006.01)
*C21D 8/02*    (2006.01)

(52) U.S. Cl.
CPC ............ *C21D 9/48* (2013.01); *C21D 8/0205* (2013.01); *C21D 8/0236* (2013.01);
(Continued)

(58) Field of Classification Search
CPC ...... C21D 8/0236; C21D 8/0294; C21D 9/46; B21B 1/06
See application file for complete search history.

(56) References Cited

U.S. PATENT DOCUMENTS 6,336,349 B1 * 1/2002 Hauger .................. B21B 37/26
72/240
2006/0033347 A1    2/2006 Hauger et al.
(Continued)

FOREIGN PATENT DOCUMENTS

DE    10041280 A1    3/2002
EP    2090668 A1    8/2009
(Continued)

OTHER PUBLICATIONS

Niendorf, T., and F. Brenne. "Steel showing twinning-induced plasticity processed by selective laser melting—An additively manufactured high performance material." Materials Characterization 85 (2013): 57-63 (Year: 2013).*

(Continued)

*Primary Examiner* — Samir Shah
*Assistant Examiner* — Sean P. O'Keefe
(74) *Attorney, Agent, or Firm* — Quinn IP

(57) ABSTRACT

The invention relates to a method for partial hardening of a steel sheet by cold deformation, where the partial hardening of a steel is done by a cold deformation with a multi-step rolling and annealing process and in order to have a steel sheet with a homogeneous thickness steel sheet is used with at least two areas having different values in mechanical and/or physical properties in longitudinal direction of the material.

3 Claims, 3 Drawing Sheets

Figure 1:
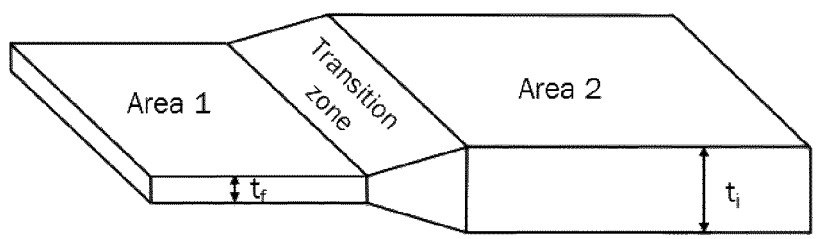

(52) U.S. Cl.
CPC ......... *C21D 8/0273* (2013.01); *C21D 8/0294* (2013.01); *C21D 2211/001* (2013.01)

(56) References Cited

U.S. PATENT DOCUMENTS

2012/0328899 A1   12/2012   Becker et al.
2021/0140008 A1*   5/2021   Palzer .................. C21D 8/0268

FOREIGN PATENT DOCUMENTS

| EP | 3301197 A1 | 4/2018 | |
|----|---|---|---|
| EP | 3470145 B1 | 3/2022 | |
| WO | 2009095264 A | 8/2009 | |
| WO | WO-2009095264 A1 * | 8/2009 | ......... B22D 11/1206 |
| WO | 2015107393 A1 | 7/2015 | |
| WO | 2014202587 A1 | 5/2016 | |

OTHER PUBLICATIONS

Edwards, W. J., P. J. Thomas, and G. C. Goodwin. "Roll eccentricity control for strip rolling mills." IFAC Proceedings vols. 20.5 (1987): 187-198. (Year: 1987).*
European Search Report for EP17195782 dated Mar. 26, 2018, European Patent Office.
Provision of Minutes in Accordance with Rule 124(4) EPC for EP17195182, dated Nov. 4, 2021, European Patent Office.
Intention to Grant A European Patent for EP17195782, dated Nov. 11, 2021, European Patent Office.
Decision to Grant a European Patent Pursuant to Article 97(1) EPC for EP17195782, dated Feb. 17, 2022, European Patent Office.
Merklein, M. et al. "A review on tailored blanks—Production, applications and evaluation," Journal of Materials Processing Technology, vol. 214, Issue 2, available online Sep. 6, 2013, pp. 151-164.
Geiger, M. et al. "Aluminum tailored heat treated blanks," Production Engineering, vol. 3, Issue 4-5, published online Oct. 15, 2009, pp. 401-410.
International Search Report of the International Searching Authority for PCT/EP2018/077648 with mailing date of Dec. 12, 2018.

* cited by examiner

METHOD FOR PARTIAL COLD DEFORMATION OF STEEL WITH HOMOGENEOUS THICKNESS

The present invention relates to a method for cold deformation of steel by utilizing a multi-step rolling and annealing process in order to have a homogeneously thick steel sheet with at least two areas having different values in mechanical and/or physical properties in longitudinal direction of the strip or coil.

Especially in transport system manufacturing like automotive car bodies, railway or commercial vehicles, but also in other mechanical engineering applications engineers use arrangements to have the right material in the right place to fulfill locally varying requirements of the component as well as for the assembled product. In such cases supposedly contradictory requirements like lightweight and safety (car body) or heat plus corrosion resistance and cost-efficiency (exhaust system) represent a challenge for the engineers. Established solutions are the so-called "multi-material design" using different materials in one assembled product whereof the so-called "Tailored Products" can be derived. Last ones are metal products which are combinations of at least two different material grades and/or material thicknesses. Tailored Products can be classified depending on their product form (coil, strip, sheet, blank, tube) or the used fabrication/assembling process like Tailored Welded Products, Tailored Patchwork Products, Tailored Bonded Products or Tailored Rolled Products.

State of the art Tailored Rolled Products are characterized by different material thicknesses along their length, and which can be cut to create a single initial blank. Flexible rolled blanks are applied in crash relevant components like pillars, cross and longitudinal members for automotive parts. Further, railway vehicles use flexible rolled blanks in side walls, roofs or the connection parts, as well as buses and trucks also apply flexible rolled blanks. But in the prior art, "right material" for flexible rolled blanks means only to have the right thickness in the right place, as during the flexible rolling manufacturing process the mechanical properties will remain the same over the whole product.

Therefore, the engineering construction way for a component to resist the ultimate load F in case of load application is only to adapt the thickness. Furthermore, the ratio of the ultimate loads F as the product of the thickness, the tensile strength $R_m$ and the width of the material between the flexible rolled area and the unrolled area must be constant. Thus, it is not possible to create areas with different strength and ductility for a subsequent forming process.

Usually a subsequent recrystallization annealing process and a galvanizing step follow the flexible rolling or eccentric rolling process.

The DE patent application 10041280 is an initial patent for flexible rolled blank in general. It describes a manufacturing method and equipment to manufacture a metal strip with different thicknesses. The way to reach that is to use an upper and a lower roll and to change the roll gap. However, this DE patent application 10041280 does not describe anything about an influence of the thickness on strength and elongation and about the correlation between strength, elongation and thickness. Furthermore, the required material for this relationship is not described, because no austenitic material is described. The WO patent application 2015107393A1 also describes a method for the manufacturing of a strip having a variable thickness along the length.

The US publication 2006033347 describes flexible rolled blanks for the usage in a lot of automotive solutions as well as the way to use a sheet material with different thicknesses. Furthermore, the US publication 2006033347 describes the necessary sheet thickness curves which are meaningful for different components. But an influence of strength and elongation, a correlation between strength, elongation and thickness, as well as the required material for this relationship are not described.

The WO publication 2014/202587 describes a manufacturing method to produce automotive parts with a thickness variable strip. The WO publication 2014/202587 relates to the usage of press-hardenable martensitic low-alloyed steels like 22MnB5 for hot-forming solutions. But a relationship between mechanical-technological values and the thickness is not described as well as an austenitic material with the described specific microstructure properties.

The EP 16191364.5 application firstly describes an improved method for cold deformation of an austenitic steel by utilizing the TWIP (Twinning Induced Plasticity), TWIP/TRIP or TRIP (Transformation Induced Plasticity) hardening effect of the austenitic steel during deformation to achieve areas in the austenitic steel product which have different values in mechanical and/or physical properties together with thickness variation. One drawback here is that such locally different values depend on the thickness. For component manufacturing processes like forming, stamping, welding or brazing, homogeneous thicknesses would allow an easier handling with a concurrent better repeatability and reproducibility as well as a lower failure rate.

The EP patent application 2090668 relates to a process for producing a high strength steel product, wherein the product is produced from a hot-rolled and/or cold-rolled and annealed TWIP steel and having an initial ratio of yield strength and tensile strength, R i, and wherein a part of the TWIP steel is subsequently subjected to a cold reduction which is chosen such that the desired ratio of yield strength and tensile strength, R d, in the part is obtained. The invention also relates to a process for producing a tailor-rolled blank and such a blank.

The WO publication 2009/095264 relates to a method for the manufacture of a TWIP-steel strip, whereby molten steel is cast in a continuous casting machine with one or more strands to form a slab having a thickness of at least 30 mm and at most 120 mm and, while making use of the casting heat, is conveyed through a furnace apparatus, is hot-rolled in a hot-rolling mill comprising one or more rolling stands into a steel strip of a desired final thickness (hf), i. in an endless rolling process wherein, a. there is a material connection between the steel in the continuous casting machine, in the furnace apparatus and the hot rolling mill and the optional forced cooling zone, or b. wherein slabs of a plurality of strands are connected so as to form a continuous slab thereby achieving a material connection between the steel in the furnace apparatus and the hot rolling mill and the optional forced cooling zone; or ii. in a semi-endless rolling process, wherein there is a material connection between the steel in the furnace apparatus and the hot rolling mill and the optional forced cooling zone, and wherein the strip after the endless or semi-endless rolling and after the optional forced cooling is cut to portions of the desired length which are subsequently coiled.

The WO publication 2015107393 relates to a method for the manufacture of a strip having a variable thickness along the length thereof, wherein said method comprises the following steps: —uniform cold rolling of the initial strip along the length thereof to obtain an intermediate strip having a constant thickness in the direction of rolling; —flexible cold rolling of the intermediate strip along the length thereof to obtain a strip having a variable thickness, along the length thereof, first areas having a first thickness (e+s) and second areas having a second thickness (e), less than the first thickness (e+s), —process annealing of the strip. The plastic deformation rate, after optional process annealing, resulting from the steps of uniform cold rolling and flexible cold rolling in the first areas is greater than or equal to 30%.

The object of the present invention is to eliminate drawbacks of the prior art and to achieve an improved method for cold deformation of steel by utilizing a multi-step rolling and annealing process in order to have a homogeneously constant thick steel sheet with at least two areas having different values and/or physical properties in longitudinal direction of the strip or coil. The multi-step process regarding to this invention generally means that it consists of three steps: First step is Flexible Rolling, second step is Annealing and the third step is a Final Flexible Rolling in reverse order to the first step, so the third step is carried out in reverse order to step 1 and the final process step is the annealing of the strip. The essential features of the present invention are enlisted in the appended claims.

In the method, according to the present invention as a starting material a hot or cold deformed strip, sheet, plate or coil made of steel with a homogeneous thickness in longitudinal direction is used. The thickness reduction in the further (cold) deformation of the starting material is combined with a specific and balanced local change in the mechanical properties of the material, such as yield strength, tensile strength and elongation. The (cold) deformation of the first process step is carried out as flexible cold rolling or as eccentric cold rolling. The thickness of the material is variable along one direction particularly in the direction of the longitudinal extension of the material corresponding to the direction of (cold) forming/rolling of the steel. The partially/locally (cold) deformed areas have the desired final thickness and show an increase in strength with a concurrent decrease of elongation in that part of the deformed product. In a second process step the partially deformed metal will be annealed having as a result different thicknesses in longitudinal direction of the product but homogeneous material properties everywhere. The general procedure is up to here more or less known from state of the art processes. Now, as a last process step and using the method of the invention the third step is carried out as flexible cold rolling or as eccentric cold rolling but in reverse order to the first step so that now the formerly thicker areas are (cold) deformed to the thickness level of the already thin deformed areas. As a result, the final (cold) deformed product shows a homogeneous thickness everywhere but with partially/locally different values in mechanical properties in longitudinal direction of the strip. The areas which were (cold) deformed before the annealing step are in annealed condition, characterized by a lower strength and higher ductility.

Conversely the areas which were (cold) deformed in the last process step can be characterized by an increased strength with lower ductility. The transition zone between the described areas is characterized by a homogeneous transition in point of their mechanical, technological and physical properties. The edge steepness must be reversed but constant between the first and the last process step of the invention to ensure a homogeneous thickness. Therefore, with the adjusted edge steepness the length of the transition zone can be influenced and adjusted for the final component in a manufacturing-aware and fit-for-purpose way.

The maximum thickness reduction Δh is a material depending value defined by the flow curve. One main value of the flow curve is the flow stress $K_f$ in N/mm². The forming degree φ generally defines the permanent geometrical change of a part because of the forming process as a form change value. Table 1 shows typical technically possible forming degrees for different grades.

TABLE 1

| Material grade | microstructure | Forming degree [%] | Flow stress [N/mm²] |
|---|---|---|---|
| 1.4003 | ferritic | 33 | 680 |
| 1.4301 | austenitic | 25 | 630 |
| 1.4509 | ferritic | 40 | 630 |
| 1.4678 | austenitic | 15 | 950 |

In the method of the invention, material is cold deformed by cold rolling in order to achieve at least two areas in the material with different specific relationships between initial (means before last step) thickness, yield strength $R_{P0,2}$ [MPa], tensile strength Rm [MPa] and elongation A80 [%] in the longitudinal and/or transversal direction of the cold deformed material. The maximum forming degree should be smaller or equal than φ≤70%. To realize a constant thickness in all areas after the last process step, the forming degree of the first and the reverse ordered third process step must be identical. Theoretically it is possible to split the method of the first process step as well as the third process step in different intermediate process steps having at the end as a sum also an identical forming degree without changing the order of the three main process steps. With regard to economic efficiency it is preferred to perform the method of the present invention in the three described main steps.

An area 1 $A_1$ can be defined which is rolled down to nearly the final thickness, then annealed and nearly not deformed during the last step with lower strength and a high ductility. Further, an area 2 $A_2$ can be defined which is nearly not influenced by cold-rolling during the first step, then annealed and in the final step cold deformed showing a high strength with lower ductility. The area can be defined as $$A_i = L_i * w * t \tag{1}$$

where L is the platform length of the area [mm], w the constant product width [mm] and t the final homogeneous thickness.

The areas have a contact to each other advantageously through a longitudinal and/or transversal transition area between these areas. In the consecutive areas with different mechanical values before and after the transition area the ultimate load $F_1$ for the annealed material and the ultimate load $F_2$ for the material deformed in the final step are determined with the formulas $$F_1 = R_{m1} * w * t \tag{2}$$

and $$F_2 = R_{m2} * w * t \tag{3}$$

In comparison to the present invention the calculation rule of state of the art processes was:

$$F_1 = R_m * w * t_1 \tag{4}$$

and $$F_2 = R_m * w * t_2 \tag{5}$$

where the tensile strength is constant and the thickness is variable.

Maintaining the material width as a constant factor, the ultimate load ratio ΔF as a percentage between the thicknesses $t_1$ and $t_2$ is then $$\Delta F = (F_2/F_1) \tag{6}$$

and respectively the thickness ratio Δt as a percentage between the loads $F_1$ and $F_2$ is $$\Delta F = (t_2/t_1) \tag{7}$$

For the present invention Δt=1.0 is always valid.
The ratio r between ΔF and Δt is then $$r = \Delta F/\Delta t = R_{m2}/R_{m1} \tag{8}$$

Further, the ratio $r_\phi$ is determined between the ratio r and the forming degree ϕ in per cents with the formula $$r_\phi = (r/\phi)*100 \tag{9}$$

According to the invention the ratio r is in the range of 1.0<r<2.0, preferably 1.20<r<1.75, and the ultimate load ratio ΔF is >1.0, preferably <1.2. Furthermore, the forming degree Φ is at the range of 5≤Φ≤60, preferably 10≤Φ≤40, and the ratio rΦ is >4.0.

For a state of the art process with an annealed material the thickness is the only influencing variable taking into account that the width is constant over the whole coil and the tensile strength too, because of the annealed condition. For a material of the present invention the maximum bearable load per area is designed by their particular material depending characteristics mentioned before and based on their specific alloying concept and microstructure.

Because of different work hardening levels (here the level is influenced by the material-depending thickness reduction and the final values, which is tailored for each application) the tensile strength $R_m$ is now the main influencing variable in accordance with the invention and the formulas (2) and (3) can be transferred into formula (8). Formula (6) shows with the force ratio of the different thickness areas and with the ratio r of formula (8) that it can be connected to the relation between thickness t and tensile strength $R_m$. For the present invention, the thickness ratio Δt which was used during the different steps of the multi-step process as the ratio between $t_2$ and $t_1$ has at the end of the whole process in every time the factor 1.0. The value of formula (7) is Δt=1.0 after the last process step and is always valid. The material of the present invention has after finishing the multi-step process at every place a nearly constant thickness having the double value of the tolerance according to the standard DIN_EN_ISO_9445-2, more preferably the value according to the standard. As an example, the thickness tolerance for a 1.5 mm material with a production width of 1250 mm is then ±0,120 mm, more preferably ±0,060 mm. That is an important difference to all state of the art flexible rolling processes which have significant differences in point of thickness for different areas. A further way to describe the material manufactured with the present invention is given with formula (9) where a relation between the material-specific forming degree ϕ and the ratio r from formula (8) is pointed out. The forming degree is a deformation parameter which in general describes the lasting geometrical changes of a component during the forming process. Therefore, the relation of formula (9) can be used as an indication for how much effort must be made to reach a further strength benefit. For the present invention $r_\phi$ should be 4.0 otherwise the effort to get a better hardening value for the load becomes uneconomic.

The cold deformed product in accordance with the invention can further be slitted into sheets, plates, slit strip or directly be delivered as a coil or strip. These half-finished products can be further processed as a tube or as another desired shape depending on the target of use.

The advantage of the present invention in combination with the used steels is that areas of high strength and areas of high ductility are combined with a homogeneous thickness. Therefore, the present invention gives the benefit to component manufacturers that forming, stamping, welding or brazing processes can be worked out without a necessary in-process adjustment of the processing parameters because of the thickness change. As a result, the handling for operating personnel is easier concurring with a higher repeatability and reproducibility as well as a lower failure rate for the component manufacturing. As one example, failures because of a relocating of the inserted sheet into a tool where the welding seam (for welding tailored products) or a sheet thickness is locally undesired, cannot occur. Therefore, the present invention confines from other flexible rolled blank products of the prior art by combining a homogeneous thickness with a specific and balanced local change in the mechanical properties of the sheet, plate or coil by a cold rolling process. An energy-intensive and cost-intensive heat treatment like a press-hardening with following local annealing and lower output is thus not necessary.

With the present invention, it is possible to achieve a flexible rolled or eccentric rolled material in a way that more ductile areas are locally available where material can thin-out and at the same time material can be (further) hardened because of its forming potential. On the other side, there are high strength areas for component areas like the ground of a deep-drawing component where usually a hardening effect cannot be realized because of too low deformation degree during the deep-drawing process.

Steels which are preferably useful in relation of the present invention are
  Stainless steels in general
  Steels with an austenitic microstructure combined with a TWIP, TRIP/TWIP or TRIP hardening effect By using stainless steels, a further surface coating is not necessary. In case the material is used for a component for vehicles the standard cataphoretic painting of the car body is sufficient. That is a benefit especially for wet corrosion parts in point of costs, production complexity and corrosion protection. In combination with the present invention there is a further advantage in point of painting: the handling is easier and the quality better because of the homogeneous thickness. With a stainless steel, it is further possible to avoid a subsequent galvanizing process after the flexible cold rolling process or eccentric cold rolling process with the same benefits pointed out for painting. Referring to the well-known properties of stainless steels, the final cold rolled material has increased properties in point of non-scaling, heat, corrosion and acid resistance. Therefore, the cold rolled materials of the invention can be used in high temperature solutions like exhaust systems but also for components in battery driven vehicles like a battery housing. An additional benefit of the fully-austenitic TWIP-hardening (stainless) steels is the non-magnetic properties under conditions like forming or welding. Therefore, these steels are suitable for the application as flexible rolled materials of the present invention in battery electric vehicle components like electric engines.

The material manufactured with the present invention is especially suitable for crash-relevant parts which locally need a high ductility to deform and absorb energy and elsewhere a high strength to withstand the impact. Such examples are crash-boxes, B-Pillars or springs, last ones defined by different spring rates D for different segments. The spring rate is in general defined as:

$$D=(E*A)/L_0 \quad (10)$$

whereby E is in general the material-depending Young's modulus [N/mm²], $L_0$ [mm] is the initial length of the spring or rather spring-like component and A is the cross-sectional area [mm].

The material of the present invention works like a compound spring for which a compensation spring rate can be defined as a series connection:

$$D=\Sigma 1/D_i=1/D_1+1/D_2+1/D_3+\ldots+1/D_n \quad (11)$$

Each flexible rolled area results in one own spring rate $D_i$.

Young's modulus is nearly constant for every area of the flexible rolled material of the present invention, but the cold-hardened higher strength areas are able to withstand a higher load before plastic deformation follows or rather the local yield strength is reached.

The component to be manufactured according to the invention
- is an automotive component, such as an airbag bush, an automotive car body component like a chassis-part, a subframe, a pillar, a cross or longitudinal member, a channel, a rocker rail,
- is a commercial vehicle component with a semi-finished sheet, tube or profile,
- is a railway vehicle component with a continuous length 2000 mm like a side wall, floor or a roof,
- is a tube manufactured out of a strip or slit strip,
- is an automotive add-on part like a crash-relevant door-side impact beam,
- is a component with non-magnetic properties for electric driven vehicles,
- is a wear and/or corrosion resistant component like cutting knifes, shares or a structural component like an extension arm of agricultural applications,
- is a chassis component for cars, trucks or busses,
- is used as a spring with segmented areas meaning locally different spring rates,
- is a rollformed or hydroformed component for transportation applications.

A preferred component manufactured with the material of the present invention could be a cross member supporting a battery compartment for battery electric vehicles (BEV) whereby the higher strength area cover the battery compartment itself. The lower strength areas protrude sideward to be constructive provided deformation zones during an impact into the battery electric vehicle and therefore to absorb the impact energy. Thereby the higher strength areas are not-deformable zones.

Another preferred embodiment of the present invention is the usage of such a material as a complete enclosed ring in vehicle cross direction. State of the art, a typical passenger car is designed with two b-pillars at each side, supplemented with cross member in roof and vehicle floor and assembled to each other or other surrounding components. With the material of the present invention it is possible to create different strength zones having at the same time a continuous thickness. As a result, one large ring could be use whereby booth b-pillars and the cross members of the roof and floor are integrated. The assembling is reduced to one joining operation to close the ring. This results in lower costs for vehicle production saving joining operations, needed invests and production time. From the view of material production various of those cross rings can be parallel arranged across the width to have an optimal material capacity with low volume of waste what also results in a higher cost-efficiency. The cross rings can be arranged repetitive in rolling direction meaning in coil or strip length having recurring the same rolling and cutting order over the whole coil or strip.

Figure 2:
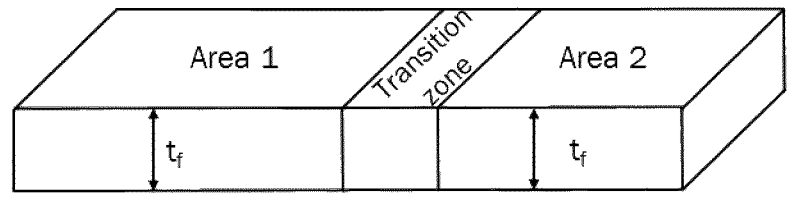
Figure 3:
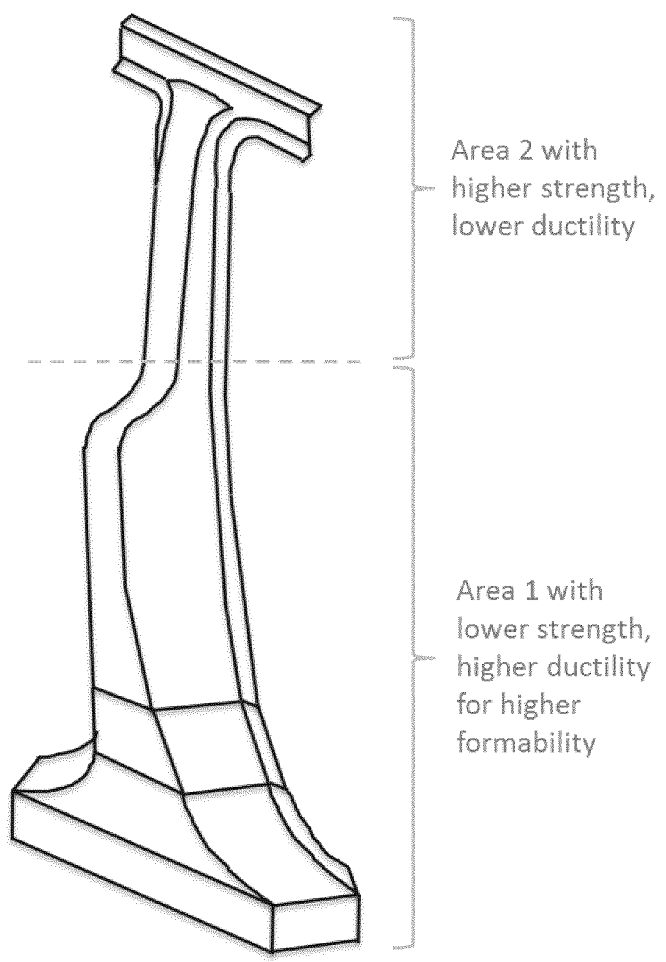
Figure 4:
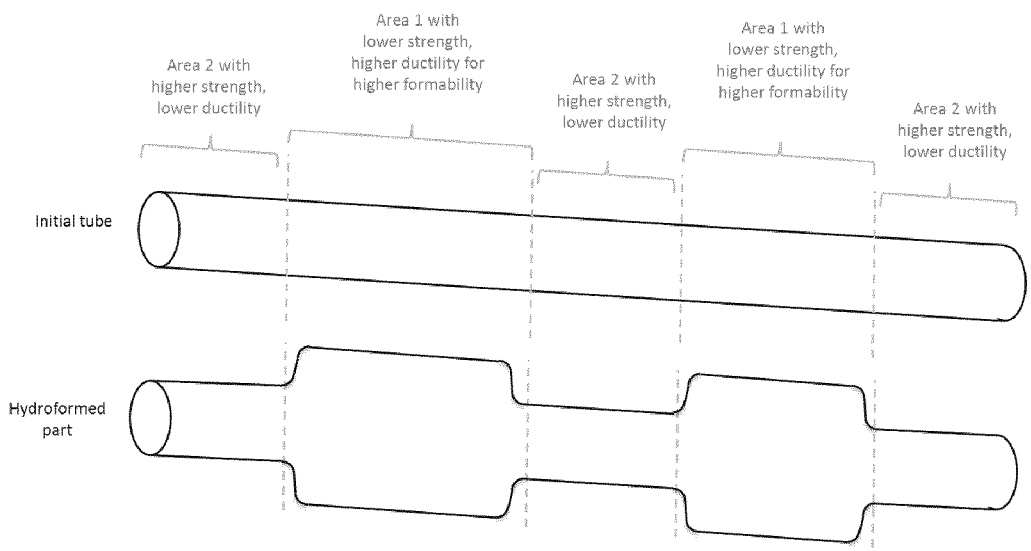
Figure 5:
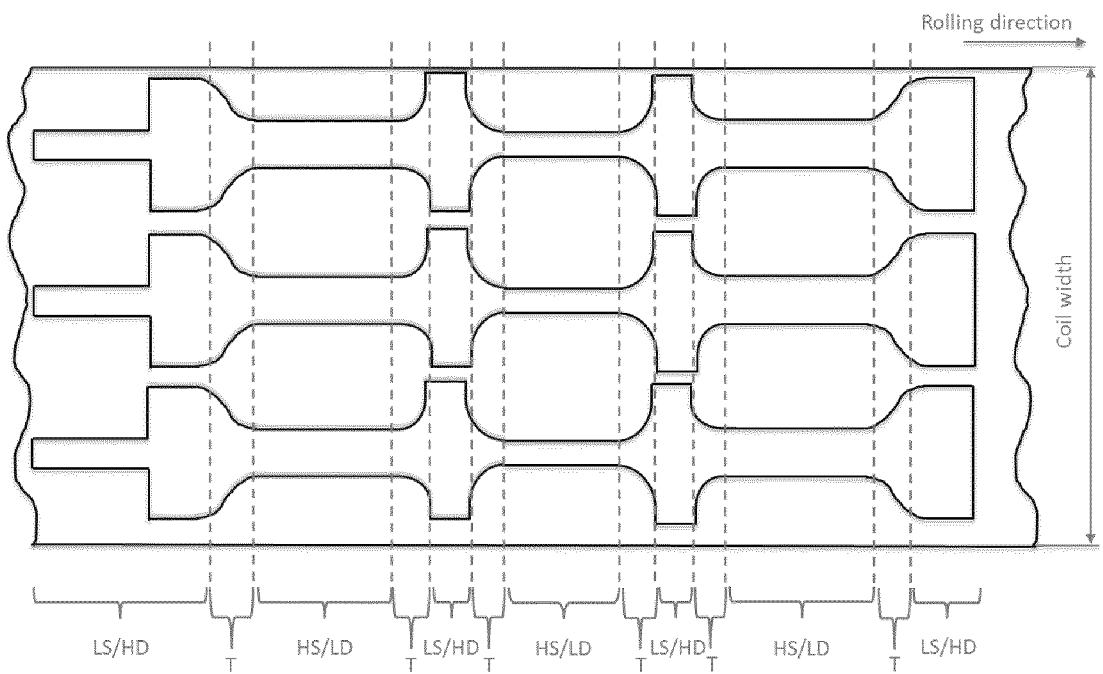

The present invention is described in more detail referring to the following drawings where FIG. 1 shows the first process step where partially/locally cold deformed areas have the desired final thickness and shows an increase of strength with a concurrent decrease of elongation at that part of the deformed product, FIG. 2 shows the material after the final process step executed in reverse order to the first step so that now the formerly thicker areas are cold deformed to the thickness level of the already thin deformed areas, FIG. 3 shows one preferable application example of the material produced with the method of the present invention, FIG. 4 shows another preferable application example of the material produced with the method of the present invention, FIG. 5 shows another preferred usage of the material produced with the method of the present invention.

In FIG. 1 is presented state of the art, where area 2 with the higher thickness ($t_i$=initial thickness) is used for higher load areas by having in all material areas constant mechanical-technological values. Area 1 represents the thinned-out area with the final thickness $t_f$ after cold-rolling. FIG. 1 also represents step 1 of the present invention.

In FIG. 2 is presented the invention where area 2 with the cold-hardening and therefore a higher strength level is used for higher load areas by having a constant thickness $t_f$ (final thickness after processing) in all material areas.

FIG. 3 represents an automotive b-pillar. In the upper area, which is the neck and head area of the passenger, a higher initial strength level is needed to create a preferably non-deformable component area and therefore to protect the passenger. For the lower area of the b-pillar a significantly more ductile material is needed to allow the complex forming of the part during component manufacturing. At the same time, a preferably high remaining ductility after forming is necessary to absorb the energy during a crash and protect the passenger in this way.

FIG. 4 represents an automotive dashboard support beam. The material produced with the method of the present invention was further processed to a longitudinal-welded tube having at least two areas with different values in mechanical and/or physical properties in longitudinal direction of the tube. Then a hydroforming process follows to form out the final component geometry. Areas without or with just a low forming degree can be designed with a higher initial strength with the method of the present invention. On the other side complex formed areas are dimensioned with more ductility with the method of the present invention. Using a fully-austenitic TWIP steel, the complex formed areas will harden during component manufacturing and the lower or non-formed areas have an initially high strength because of the method of the present invention.

FIG. 5 represents a cutting pattern of a coil or strip produced with the method of the present invention. Thereby a cross ring integrating the formally single parts of two b-pillars, a roof cross member and a floor cross member. In doing so, various cross rings can be parallel arranged across the width to have an optimal material capacity with low volume of waste. FIG. 5 and therefore the cross rings can be arranged repetitive in rolling direction meaning in coil or strip length having recurring the same rolling and cutting order. In FIG. 5 the higher strength but lower ductility material areas are identified with "HS/LD" usually needed and exemplary signed in FIG. 5 for the b-pillar trees and the roof cross member. In these areas, an impact-resistance having non-deformable zones are necessary. On the other side lower strength but higher ductility material areas are marked with "LS/HD" usually needed and exemplary signed in FIG. 5 for the b-pillar feets, the b-pillar links to the roof and the underbody cross member. The feets of the b-pillars have the task to absorb the crash energy whereas the b-pillar links to the roof needs a high ductility to connect the areas with the roof longitudinal structures. Furthermore, the underbody cross member will be complex formed to increase component stiffness and therefore a high ductility is needed there. The transition zones between the high and lower strength material areas are characterized in FIG. 5 with "T".

The method according to the present invention was tested with the stainless steels 1.4301 (TRIP-hardened austenitic, CrNi alloyed), 1.4462 (ferritic-austenitic Duplex structure, CrNiMo alloyed) and 1.4678 (TWIP-hardened fully-austenitic, CrMn alloyed). The results are shown in table 2.

TABLE 2

| Grade | Initial thickness [mm] | Resulting thickness [mm] | Tensile strength [MPa] Area 1 | Tensile strength [MPa] Area 2 | Ratio r [—] | Forming degree φ [%] | Relation $r_\varphi$ [—] |
|---|---|---|---|---|---|---|---|
| 1.4301 | 2.0 | 1.6 | 665 | 925 | 1.39 | 20 | 7.0 |
| 1.4462 | 2.0 | 1.2 | 825 | 1405 | 1.70 | 40 | 4.3 |
| 1.4678 | 2.0 | 1.5 | 935 | 1040 | 1.51 | 25 | 6.0 |

The invention claimed is:

1. A method for partial hardening of a steel sheet by cold deformation during a multi-step rolling and annealing process, the steel sheet having a homogeneous thickness including at least first and second areas having different values in mechanical and/or physical properties in a longitudinal direction of the steel sheet, the steel sheet made of an austenitic TWIP hardening steel selected from the group consisting of a hot deformed strip, a cold deformed strip, sheet, plate and coil, and having a homogeneous initial thickness in a longitudinal direction, the method comprising:

in a first thickness reducing step, reducing the initial thickness in the longitudinal direction of one or more first areas in a cold deformation process from the initial thickness to a final thickness in the longitudinal direction that is less than the initial thickness in the longitudinal direction, to provide a partially deformed steel sheet;

wherein the first thickness reducing step is carried out by flexible cold rolling;

the partially deformed steel sheet including:

the one or more first areas with the final thickness, wherein the one or more first areas with the final thickness has an increased strength concurrent with a decrease in elongation relative to the one or more first areas with an initial thickness; and one or more second areas with the initial thickness;

the method further comprising:

annealing the partially deformed steel sheet to an annealed condition, to provide an annealed partially deformed steel sheet;

the annealed partially deformed steel sheet having:

more than one thickness in the longitudinal direction, and homogeneous material properties;

in a second thickness reducing step, reducing the thickness of the one or more second areas of the annealed partially deformed steel sheet in the longitudinal direction to the final thickness to provide a deformed steel material having a homogeneous thickness in the longitudinal direction;

wherein the second thickness reducing step is carried out by flexible cold rolling and in reverse order to the first thickness reducing step;

wherein a forming degree (Φ) in each thickness reducing step is in the range of 5≤Φ≤60%, said forming degree (Φ) being identical in each thickness reducing step; and wherein said reducing the thickness of the one or more second areas provides a partially hardened deformed steel sheet;

the partially hardened deformed steel sheet including:

the first and second areas with different material properties in the longitudinal direction of the partially hardened deformed steel material, the second areas being hardened by the second thickness reducing step, having a tensile strength $R_{m2}$, and the first areas being in the annealed condition, having a tensile strength $R_{m1}$;

the partially hardened deformed steel sheet having a ratio $(r)=R_{m2}/R_{m1}$; wherein the ratio (r) is in the range of 1.2<r<1.75.

2. The method according to claim 1, wherein the forming degree (φ) is in the range of 10≤φ≤40%.

3. A method for partial hardening of a steel sheet by cold deformation during a multi-step rolling and annealing process, the steel sheet having a homogeneous thickness including at least first and second areas having different values in mechanical and/or physical properties in a longitudinal direction of the steel sheet, the steel sheet made of an austenitic TWIP hardening steel selected from the group consisting of a hot deformed strip, a cold deformed strip, sheet, plate and coil, and having a homogeneous initial thickness in a longitudinal direction, the method comprising:

in a first thickness reducing step, reducing the initial thickness in the longitudinal direction of one or more first areas in a cold deformation process from the initial thickness to a final thickness in the longitudinal direction that is less than the initial thickness in the longitudinal direction, to provide a partially deformed steel sheet;

wherein the first thickness reducing step is carried out by eccentric cold rolling;

the partially deformed steel sheet including:

the one or more first areas with the final thickness, wherein the one or more first areas with the final thickness has an increased strength concurrent with a decrease in elongation relative to the one or more first areas with an initial thickness; and one or more second areas with the initial thickness;

the method further comprising:

annealing the partially deformed steel sheet to an annealed condition, to provide an annealed partially deformed steel sheet;

the annealed partially deformed steel sheet having:

more than one thickness in the longitudinal direction, and homogeneous material properties;

in a second thickness reducing step, reducing the thickness of the one or more second areas of the annealed partially deformed steel sheet in the longitudinal direction to the final thickness to provide a deformed steel material having a homogeneous thickness in the longitudinal direction;

wherein the second thickness reducing step is carried out by eccentric cold rolling and in reverse order to the first thickness reducing step;

wherein a forming degree ($\Phi$) in each thickness reducing step is in the range of $5 \leq \Phi \leq 60\%$, said forming degree ($\Phi$) being identical in each thickness reducing step; and wherein said reducing the thickness of the one or more second areas provides a partially hardened deformed steel sheet;

the partially hardened deformed steel sheet including:

the first and second areas with different material properties in the longitudinal direction of the partially hardened deformed steel material, the second areas being hardened by the second thickness reducing step, and the first areas being in the annealed condition.

* * * * *